(12) United States Patent
Nishikoori

(10) Patent No.: US 10,882,121 B2
(45) Date of Patent: Jan. 5, 2021

(54) DRILL AND METHOD FOR MANUFACTURING MACHINED PRODUCT

(71) Applicant: KYOCERA Corporation, Kyoto (JP)

(72) Inventor: Hironori Nishikoori, Yasu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/473,258

(22) PCT Filed: Dec. 25, 2017

(86) PCT No.: PCT/JP2017/046366
§ 371 (c)(1),
(2) Date: Jun. 25, 2019

(87) PCT Pub. No.: WO2018/123937
PCT Pub. Date: Jul. 5, 2018

(65) Prior Publication Data
US 2019/0366450 A1 Dec. 5, 2019

(30) Foreign Application Priority Data

Dec. 26, 2016 (JP) .................... 2016-250973

(51) Int. Cl.
*B23B 51/02* (2006.01)
(52) U.S. Cl.
CPC .......... *B23B 51/02* (2013.01); *B23B 2251/04* (2013.01); *B23B 2251/14* (2013.01)
(58) Field of Classification Search
CPC ................ B23B 51/02; B23B 2251/02; B23B 2251/505; B23B 2251/50;
(Continued)

(56) References Cited

U.S. PATENT DOCUMENTS 9,370,829 B2 * 6/2016 Tamura ................... B23B 51/02
2003/0039522 A1 * 2/2003 Yanagida ................ B23B 51/02
408/230

(Continued)

FOREIGN PATENT DOCUMENTS

CA 2753802 A1 * 9/2010 ............. B23B 51/02
DE 102013212369 A1 * 1/2014 ............. B23B 51/02
(Continued)

OTHER PUBLICATIONS

Description DE102013212369 (translation) obtained at https://worldwide.espacenet.com/ (last visited May 1, 2020).*

*Primary Examiner* — Ryan C Rufo
(74) *Attorney, Agent, or Firm* — Viering, Jentschura & Partner MBB

(57) ABSTRACT

A drill according to a non-limiting aspect may have a body, a cutting edge, a rake face, and a groove. The cutting edge may have a curved chisel edge, a pair of first cutting edges, and a pair of second cutting edges. The second cutting edge may have a first portion extending from the chisel edge and a second portion extending from the first portion toward the first cutting edge. The rake face may have a first region extending from the first portion and a second region extending from the second portion. A first rake angle of the first region may be zero or a negative value. A second rake angle of the second region may be a negative value. An absolute value of the second rake angle may be greater than an absolute value of the first rake angle.

18 Claims, 9 Drawing Sheets

(58) Field of Classification Search
CPC .......... B23B 2251/046; B23B 2251/04; B23B 2251/085; B23B 2251/082; B23B 2251/14; B23B 2251/18
See application file for complete search history.

(56) References Cited

U.S. PATENT DOCUMENTS

| | | | | |
|---|---|---|---|---|
| 2009/0226271 | A1* | 9/2009 | Sampath | B23B 51/02 408/227 |
| 2009/0279965 | A1* | 11/2009 | Soittu | B23B 51/06 408/59 |
| 2010/0316456 | A1* | 12/2010 | George | B23B 51/02 408/230 |
| 2012/0076597 | A1 | 3/2012 | Krenzer et al. | |
| 2012/0201619 | A1* | 8/2012 | Olsson | B24B 3/32 408/230 |
| 2014/0219737 | A1* | 8/2014 | Takai | B23B 51/06 408/229 |
| 2016/0256937 | A1* | 9/2016 | Guter | B24B 3/24 |

FOREIGN PATENT DOCUMENTS

| | | | |
|---|---|---|---|
| JP | 01092019 A | * | 4/1989 |
| JP | 01216707 A | * | 8/1989 |
| JP | 2011513083 A | | 4/2011 |
| JP | 2012192514 A | | 10/2012 |
| JP | 2012529375 A | | 11/2012 |
| JP | 2012529998 A | | 11/2012 |
| WO | 2009114353 A2 | | 9/2009 |
| WO | 2010147715 A2 | | 12/2010 |

\* cited by examiner

DRILL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2017/046366 filed on Dec. 25, 2017, which claims priority to Japanese Application No. 2016-250973 filed on Dec. 26, 2016, which are entirely incorporated herein by reference.

TECHNICAL FIELD

The present disclosure relates to a drill used in cut processing, and a method for manufacturing a machined product.

BACKGROUND

Drills such as a drill described in JP2011-513083 T (Patent Document 1) are used for machining workpieces such as metal members. The drill described in Patent Document 1 has, as cutting edges, a chisel edge and a pair of cutting lips positioned with the chisel edge interposed therebetween, and further has a primary margin and a secondary margin. Then, a chisel edge angle is 80 to 100 degrees. Patent Document 1 describes that such a configuration maximizes the straightness of a hole and minimizes the "slippage" of the drill on a machined product.

In such a drill as described in Patent Document 1, an attempt has been made to maximize the straightness of the hole, but since a rake angle of a portion of the cutting edge positioned on a tip end side is positive, a tip of the cutting edge may be prematurely damaged. In particular, when machining a workpiece whose surface is partially hard, as in cast iron machining in which the surface of the workpiece is often hard due to a casting surface or the like, the tip of the cutting edge may be prematurely damaged.

In light of the foregoing, an object of the present aspect is to provide a drill capable of improving straightness of a machined hole and also reducing a risk that a cutting edge is damaged prematurely.

SUMMARY

A drill according to a non-limiting aspect may have a body having a rod-like shape and extending along a rotational axis from a first end toward a second end, a cutting edge positioned at the first end of the body, a rake face extending from the cutting edge toward a side of the second end of the body, and a pair of grooves extending spirally from the rake face toward the side of the second end of the body. When the body is viewed toward the first end, the cutting edge may have a curved chisel edge intersecting with the rotational axis, a first cutting edge positioned on a side of an outer periphery of the body with respect to the chisel edge, and a second cutting edge connected to the chisel edge and the first cutting edge. When the body is viewed toward the first end, the second cutting edge may have a first portion extending from the chisel edge toward the outer periphery of the body, and a second portion extending from the first portion toward the first cutting edge and positioned to be inclined with respect to the first portion. The rake face may have a first region extending from the first portion and a second region extending from the second portion. A first rake angle of the first region may be one of zero and a negative value, and a second rake angle of the second region may be a negative value. An absolute value of the second rake angle may be greater than an absolute value of the first rake angle.

DETAILED DESCRIPTION

Figure 1:
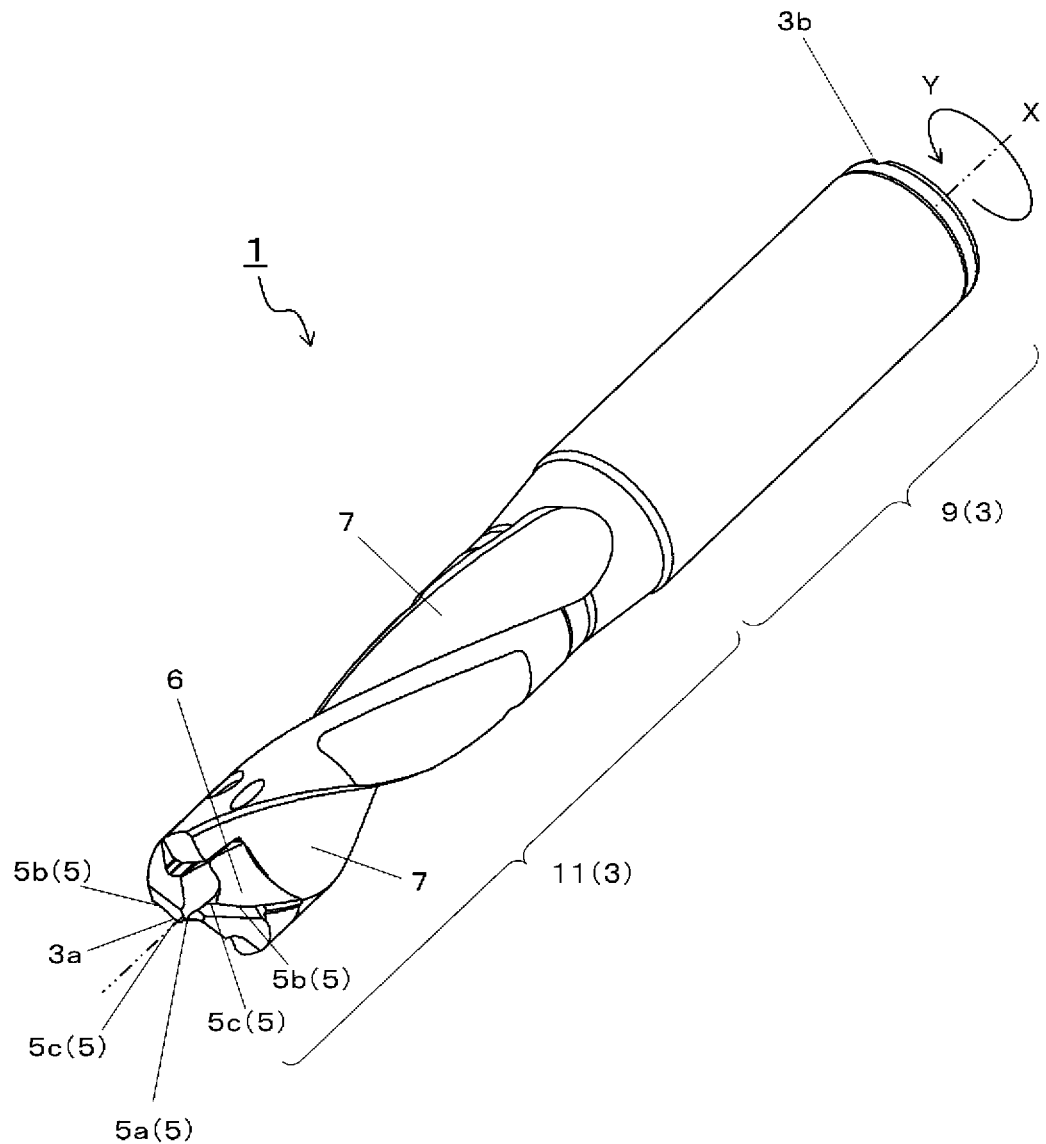
FIG. 1 is a perspective view illustrating a drill according to a non-limiting embodiment of the present disclosure.

A drill according to non-limiting embodiments of the present disclosure will be described below in detail with reference to the drawings. However, for convenience of explanation, each of the drawings referenced below may be simplified to illustrate only the main members of the constituent members of the non-limiting embodiments. Thus, the drill according to the present invention may be provided with any constituent members not illustrated in the referenced drawings. Further, the dimensions of the members in the drawings do not faithfully represent the actual dimensions of the constituent members, the dimension ratios of the members, or the like.

Drill

An example of a drill 1 illustrated in FIG. 1 may have a body 3, a cutting edge 5, a rake face 6, and grooves 7.

Figure 2:
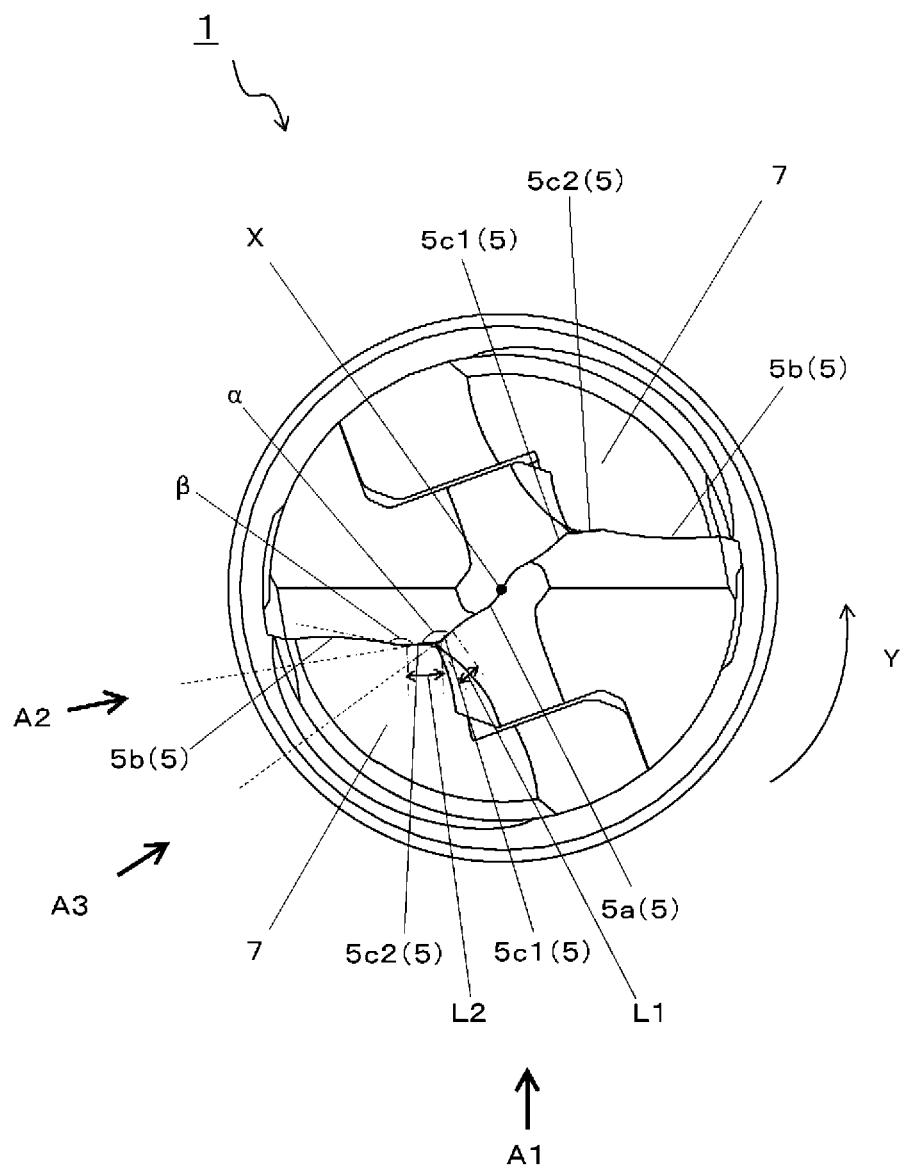
FIG. 2 is a front view of the drill illustrated in FIG. 1 from a direction of a first end.
Figure 3:
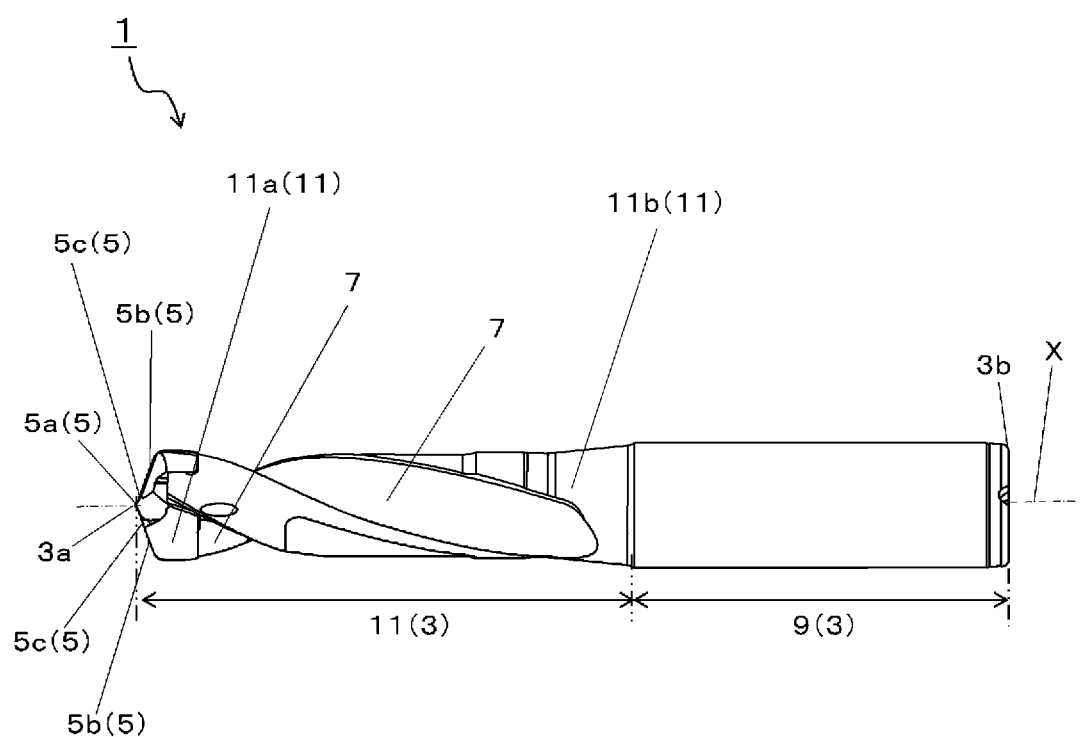
FIG. 3 is a side view of the drill illustrated in FIG. 2 from a direction A1.

As illustrated in FIG. 1 to FIG. 3, the body 3 may have a rotational axis X and a rod-like shape extending along the rotational axis X from a first end 3a toward a second end 3b. The body 3 may be rotatable around the rotational axis X when machining a workpiece. Note that, in the following description, the first end 3a will be referred to as a tip end 3a, and the second end 3b will be referred to as a rear end 3b. Further, a side of the first end 3a that is closer to the first end 3a than the second end 3b will be referred to as a side of a tip end 3a, and a side of the second end 3b that is closer to the second end 3b than the first end 3a will be referred to as a side of a rear end 3b.

The body 3 may have a shank 9 and a cutting portion 11. The shank 9 in the example illustrated in FIG. 1 may be a portion that is gripped by a rotating spindle or the like of a machine tool (not illustrated) and is designed according to the shape of the spindle or the like in the machine tool. The cutting portion 11 in the example illustrated in FIG. 1 is a portion that may be positioned on the side of the tip end 3a with respect to the shank 9, may have an area that comes into contact with the workpiece, and may play a key role when machining the workpiece. Here, an arrow Y in FIG. 1 and FIG. 2 may indicate a direction in which the body 3 rotates around the rotational axis X.

Figure 4:
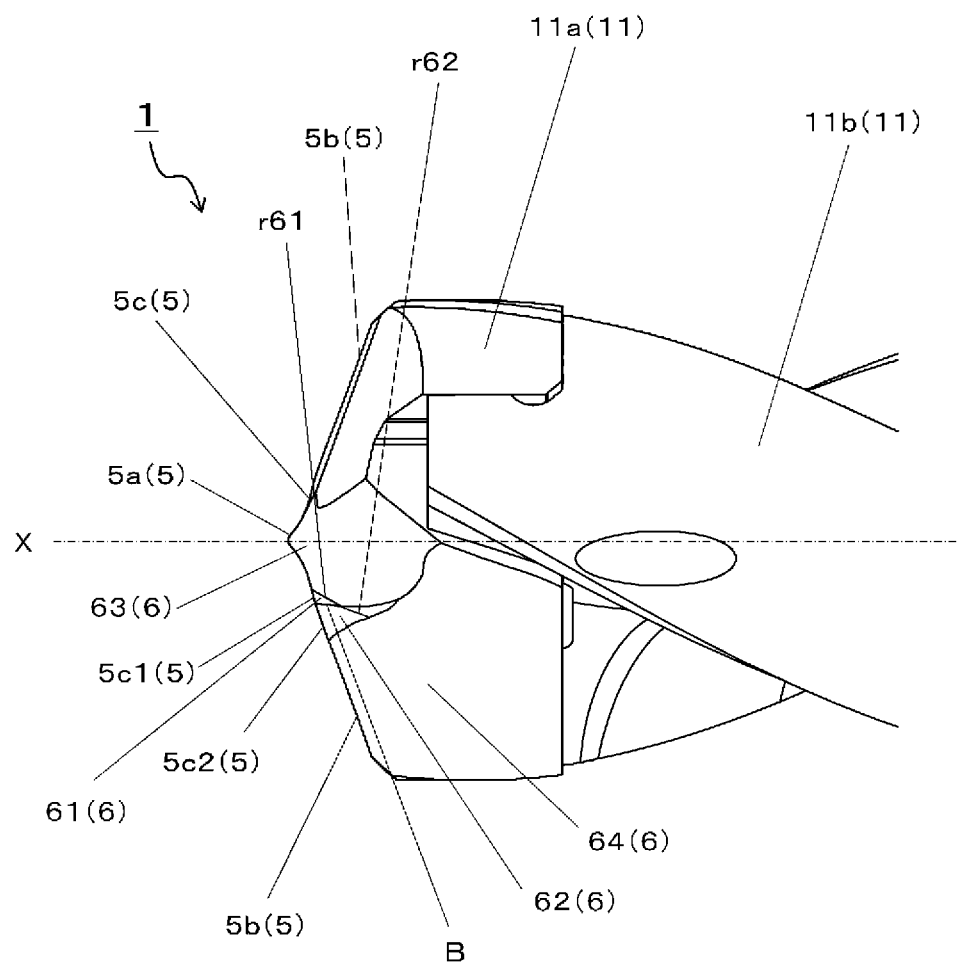
FIG. 4 is an enlarged view of a main portion of FIG. 3.

The cutting portion 11 in an example illustrated in FIG. 3 and FIG. 4 may be configured such that a portion on the side of the tip end 3a (a tip portion 11a), which has the cutting edge 5, the rake face 6, and a portion of the grooves 7, may be detachable from a portion on the side of the rear end 3b (a rear end portion 11b). More specifically, the tip portion 11a may be restrained by being gripped by the rear end portion 11b. The cutting portion 11 may be not limited to such a configuration, and the tip portion 11a and the rear end portion 11b may be integrally formed. In general, the drill 1 having the configuration in which the tip portion 11a and the rear end portion 11b are integrally formed may be referred to as a solid drill.

For example, the cutting portion 11 may have a shape formed by removing spaces corresponding to the grooves 7 from a circular column extending along the rotational axis X, as illustrated in FIG. 2. In this case, in a cross section orthogonal to the rotational axis X, portions corresponding to lands on an outer peripheral surface of the cutting portion 11, from which the grooves 7 are removed, may form arc-shapes on substantially the same circle. The diameter of substantially the same circle may correspond to the outer diameter of the cutting portion 11.

The outer diameter of the cutting portion 11 may be set to be from 6 mm to 42.5 mm, for example. Further, when the length of an axis line (a length of the cutting portion 11) is L and the diameter (the outer diameter of the cutting portion 11) is D, L=2D to 20D may also be satisfied, for example.

Examples of the material of the body 3 may include a cemented carbide alloy that contains tungsten carbide (WC) and cobalt (Co) that may be a binder phase, an alloy that may contain this cemented carbide alloy with an additive such as titanium carbide (TiC) or tantalum carbide (TaC) added thereto, a metal such as stainless steel and titanium, and the like.

Below, a description will be given of the cutting edge 5. The cutting edge 5 may be positioned at the tip end 3a of the body 3 and may be a portion that can be used for cutting the workpiece. In the example illustrated in FIG. 1, the cutting edge 5 may be positioned at the tip end 3a of the body 3, that is, in a tip portion of the cutting portion 11.

Then, in an example illustrated in FIG. 2, the cutting edge 5 may have a chisel edge 5a, a first cutting edge 5b, and a second cutting edge 5c. When the body 3 is viewed from the tip, the chisel edge 5a may have a curved shape and intersect with the rotational axis X. The first cutting edge 5b may be positioned on the side of the outer periphery of the body 3 with respect to the chisel edge 5a. The second cutting edge 5c may be positioned between the chisel edge 5a and the first cutting edge 5b. Here, the chisel edge 5a and the first cutting edge 5b may be connected via the second cutting edge 5c.

When the second cutting edge 5c is positioned between the chisel edge 5a and the first cutting edge 5b, an angle at which portions of adjacent cutting edges cross can be reduced as compared to that in a case where the chisel edge 5a and the first cutting edge 5b are directly connected. Thus, loads may be less likely to be concentrated in a specific region of the cutting edge 5, and the cutting edge 5 may have high durability.

The first cutting edge 5b in the example illustrated in FIG. 2 may be a main portion that cuts the workpiece when machining the workpiece, and may be regarded as a main cutting edge. Also, the second cutting edge 5c in the example illustrated in FIG. 2 may be a portion that connects the chisel edge 5a and the first cutting edge 5b, and may be regarded as a connecting edge or a thinning edge.

Each of the chisel edge 5a, the first cutting edge 5b, and the second cutting edge 5c may be provided alone, or each may be provided in a plurality thereof. In the example illustrated in FIG. 2, the cutting edge 5 may have two first cutting edges 5b and two second cutting edges 5c. As in the example illustrated in FIG. 2, the two first cutting edges 5b may be rotationally symmetrical by 180 degrees around the rotational axis X to be paired. As in the example illustrated in FIG. 2, the two second cutting edges 5c may be rotationally symmetrical by 180 degrees around the rotational axis X to be paired.

When the pair of first cutting edges 5b and the pair of second cutting edges 5c are rotationally symmetrical by 180 degrees around the rotational axis X, shaking of the cutting edge 5 can be reduced when the cutting edge 5 bites into the workpiece. Note that even when the cutting edge 5 has three or more first cutting edges 5b and three or more second cutting edges 5c, this configuration does not cause any problem.

As in the example illustrated in FIG. 2, the pair of second cutting edges 5c may be connected to both end portions of the chisel edge 5a, and when viewed from the tip, may each extend from both ends of the chisel edge 5a toward the outer periphery of the body 3. Further, the pair of first cutting edges 5b may be respectively connected to end portions, on the side of the outer periphery, of the pair of second cutting edges 5c, and when viewed from the tip, may each extend from the second cutting edge 5c toward the outer periphery of the body 3.

The chisel edge 5a may be a portion positioned on an innermost peripheral side of the cutting edge 5. Then, the pair of first cutting edges 5b may be positioned on the side of the outer periphery of the body 3 with respect to the chisel edge 5a and the pair of second cutting edges 5c, and may each be a portion positioned on an outermost peripheral side of the cutting edge 5. The workpiece can be cut using the chisel edge 5a, the pair of first cutting edges 5b, and the pair of second cutting edges 5c.

Here, "when viewed from the tip" may refer to a view of the body 3 toward the tip end 3a along the rotational axis X, as illustrated in FIG. 2. Specifically, "when viewed from the tip" can also be described as a front view of the tip end 3a of the body 3. Further, when viewed from the tip, a side closer to the outer peripheral surface of the body 3 than the rotational axis X may be referred to as the side of the outer periphery, and a side closer to the rotational axis X than the outer peripheral surface of the body 3 may be referred to as an inner peripheral side.

As illustrated in FIG. 4, the chisel edge 5a may be positioned closest to a side of a tip end direction of the drill 1, and may protrude toward the side of the tip end 3a with respect to the first cutting edges 5b and the second cutting edges 5c. In the example illustrated in FIG. 4, a portion of the chisel edge 5a intersecting with the rotational axis X may be positioned closest to the side of the tip end direction and may be inclined toward the side of the rear end 3b of the body 3 as far away from the rotational axis X. A so-called chisel angle of the chisel edge 5a may be set to approximately from 110 to 170 degrees, for example.

As illustrated in FIG. 2, the pair of first cutting edges 5b may be positioned separately with the chisel edge 5a interposed therebetween. Also, as illustrated in FIG. 2, the pair of second cutting edges 5c may be positioned separately with the chisel edge 5a interposed therebetween.

As illustrated in FIG. 2, when viewed from the tip, the first cutting edge 5b may at least partially have a concave curved shape. When viewed from the tip, when the first cutting edge 5b has a concave curved portion, chips generated by the first cutting edge 5b may be easily curled. As a result, the chips may be easily discharged by the grooves 7.

As illustrated in FIG. 2, when viewed from the tip, the second cutting edge 5c may have a first portion 5c1 and a second portion 5c2 in this order from the side of the inner periphery. The first portion 5c1 of the second cutting edge 5c in the example illustrated in FIG. 2 may extend from the chisel edge 5a toward the outer periphery of the body 3. The first portion 5c1 may be linear as illustrated in FIG. 2. The second portion 5c2 of the second cutting edge 5c in the example illustrated in FIG. 2 may extend from the first portion 5c1 toward the first cutting edge 5b and may be positioned to be inclined with respect to the first portion 5c1.

As illustrated in FIG. 4, in a side view from a direction orthogonal to the rotational axis X, the first portion 5c1 may extend from an end portion of the chisel edge 5a toward the outer periphery. Here, when a pair of imaginary lines are drawn along each of the pair of first portions 5c1 in a side view, an angle of intersection of these imaginary lines may be set to approximately from 130 to 170 degrees, for example.

Further, as illustrated in FIG. 4, in a side view from the direction orthogonal to the rotational axis X, the second portion 5c2 may extend from the first portion 5c1 toward the first cutting edge 5b. Here, when a pair of imaginary lines are drawn along each of the pair of second portions 5c2 in a side view, an angle of intersection of these imaginary lines may be set to approximately from 130 to 170 degrees, for example.

In the example illustrated in FIG. 2, the first portion 5c1 may be linear, and the second portion 5c2 may be positioned to be inclined with respect to the first portion 5c1. On the other hand, the chisel edge 5a may have a curved shape. Therefore, in the example illustrated in FIG. 2, a portion of the cutting edge 5 intersecting with the rotational axis X and forming the curved shape may be the chisel edge 5a. Then, a portion of the cutting edge 5 that is linear and connects to the chisel edge 5a may be the first portion 5c1, and a portion connected to the first portion 5c1 in an inclined manner may be the second portion 5c2.

Next, a description will be given of the groove 7. The groove 7 may be positioned on the side of the outer periphery with respect to the rotational axis X in the cutting portion 11 of the body 3, and as illustrated in FIG. 1 and FIG. 3, may extend from a position near the cutting edge 5 toward the rear end 3b of the body 3.

As illustrated in FIG. 1 and the like, the groove 7 may extend spirally around the rotational axis X. In the example illustrated in FIG. 1, the cutting edge 5 may have two first cutting edges 5b and two second cutting edges 5c. Thus, in the example illustrated in FIG. 1, each of a pair of the grooves 7 may extend spirally from a position near the pair of first cutting edges 5b in the cutting edge 5 toward the rear end 3b of the body 3. Here, in order to stably grip the body 3 in a machine tool, the grooves 7 may be formed only in the cutting portion 11, and may not be formed in the shank 9.

The grooves 7 can be used to discharge the chips generated by the cutting edge 5 (the chisel edge 5a, the first cutting edges 5b, and the second cutting edges 5c) to the outside. When machining using the drill 1 of the example illustrated in FIG. 1, the chips generated by one of the pair of first cutting edges 5b may be discharged to the side of the rear end 3b of the body 3 through the groove 7, of the pair of grooves 7, which extends toward the one of the pair of first cutting edges 5b. In addition, the chips generated by another one (the other one) of the pair of first cutting edges 5b may be discharged to the side of the rear end 3b of the body 3 through the groove 7, of the pair of grooves 7, which extends toward the other one of the pair of first cutting edges 5b.

Here, the one of the pair of grooves 7 may be formed so as to overlap with the other one of the pair of grooves 7 when the other one of the pair of grooves 7 is rotated by 180 degrees around the rotational axis X. This may allow the chips generated by each of the pair of first cutting edges 5b to flow smoothly through the corresponding groove 7.

The depth of the groove 7 may be set to, for example, approximately from 10 to 40% relative to the outer diameter of the cutting portion 11. Here, the depth of the groove 7 may refer to a value obtained by subtracting a distance between a bottom of the groove 7 and the rotational axis X, from the radius of the body 3 in a cross section orthogonal to the rotational axis X, for example. Here, the bottom of the groove 7 may mean a portion of the groove 7 closest to the rotational axis X. When the outer diameter of the cutting portion 11 is 20 mm, the depth of the groove 7 can be set to approximately from 2 to 8 mm, for example.

Next, a description will be given of the rake face 6. In the body 3 of the example illustrated in FIG. 1, the rake face 6 may be provided in a region along the cutting edge 5. Specifically, the rake face 6 may extend from the cutting edge 5 toward the side of the rear end 3b of the body 3. More specifically, the rake face 6 may have a region along each portion of the cutting edge 5.

As illustrated in FIG. 4, the rake face 6 may have a first region 61 extending from the first portion 5c1 and a second region 62 extending from the second portion 5c2. A first rake angle $\theta 1$ of the first region 61 may be zero or a negative value. In an example illustrated in FIG. 5, the first rake angle $\theta 1$ of the first region 61 may be zero. In an example illustrated in FIG. 6, a second rake angle $\theta 2$ of the second region 62 may be a negative value.

Here, an absolute value of the second rake angle $\theta 2$ may be greater than an absolute value of the first rake angle $\theta 1$. In the examples illustrated in FIG. 5 and FIG. 6, the second cutting edge 5c may have two portions positioned so as to be bent with respect to each other (the first portion 5c1 and the second portion 5c2), and the rake angles $\theta 1$ and $\theta 2$ of regions (the first region 61 and the second region 62) of the rake face 6 extending from the second cutting edge 5c satisfy the above-described relationship. In this case, since the cutting edge 5 has high fracture resistance and a component acting toward the side of the rear end 3b (a component acting along the rotational axis X) of a cutting force generated during machining is large, the body 3 may be less likely to swing in a radial direction. Thus, the cutting edge 5 may be less likely to be damaged prematurely, and straightness of a machined hole may be high.

Here, the first rake angle $\theta 1$ of the first region 61 can be evaluated as an inclination angle of the first region 61 with respect to an imaginary line parallel with the rotational axis X. The second rake angle $\theta 2$ of the second region 62 can be evaluated in a similar manner, as illustrated in FIG. 6. Note that FIG. 5 is a side view of the body 3 as viewed from a direction along the first portion 5c1, and FIG. 6 is a side view of the body 3 as viewed from a direction along the second portion 5c2.

Figure 5:
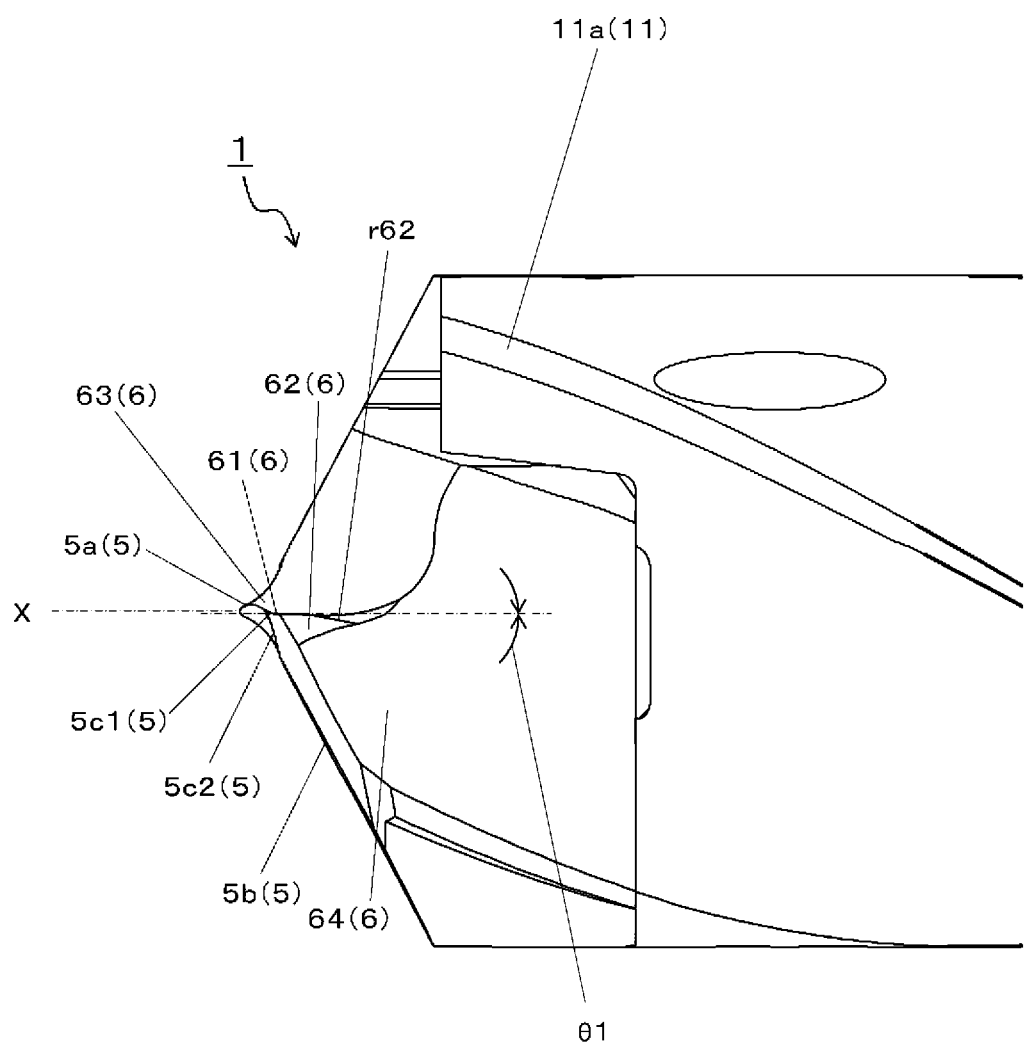
FIG. 5 is a side view of the drill illustrated in FIG. 2 from a direction A2.
Figure 6:
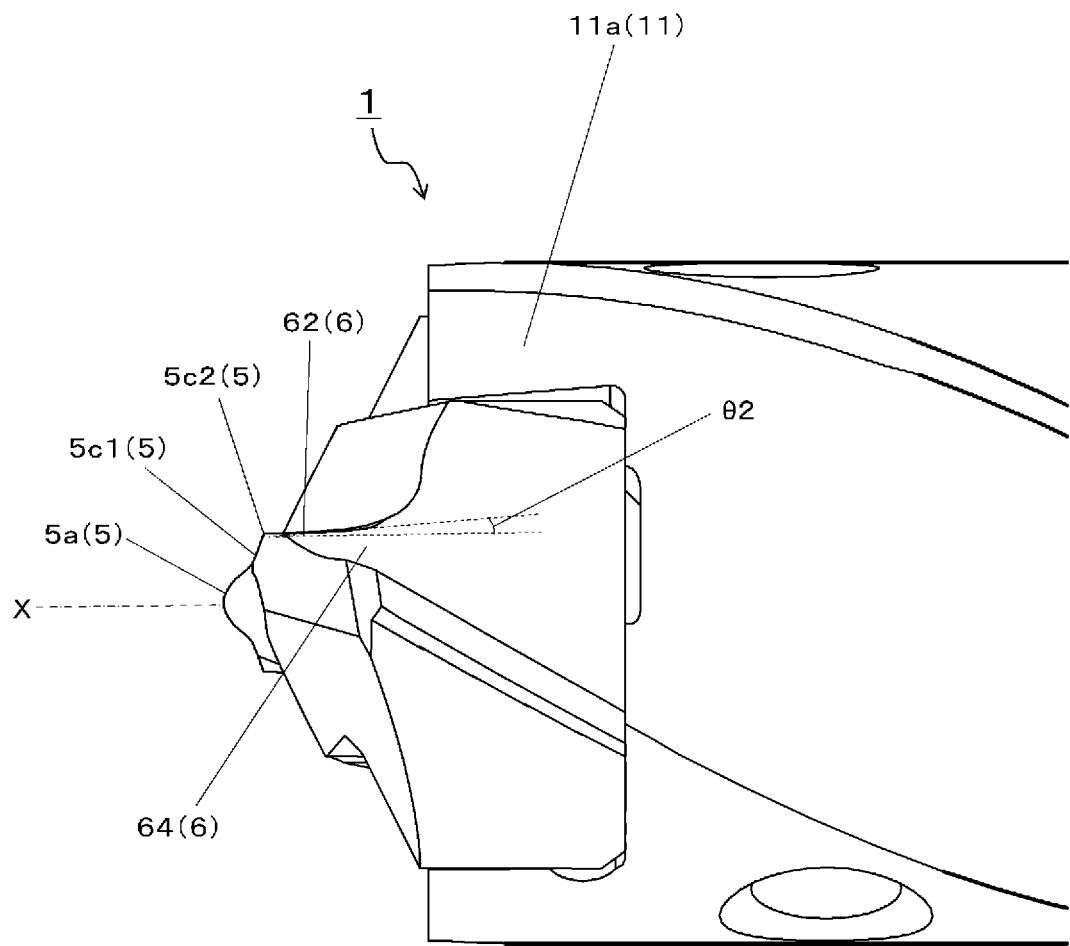
FIG. 6 is a side view of the drill illustrated in FIG. 2 from a direction A3.

In the examples illustrated in FIG. 5 and FIG. 6, the first rake angle $\theta 1$ may be zero or a negative value and the second rake angle $\theta 2$ may be a negative value. In addition, the absolute value of the second rake angle θ2 may be greater than the absolute value of the first rake angle θ1 (|θ2|>|θ1|). In other words, a value of the second rake angle θ2 itself may be smaller than a value of the first rake angle θ1 itself (θ2<θ1).

Note that when the first rake angle θ1 of the first region 61 and the second rake angle θ2 of the second region 62 are not constant in each of the regions, a relation between |θ2| and |θ1| can be evaluated by comparing a minimum value |θ2|Min of the absolute value of the second rake angle θ2 in the second region 62, with a maximum value |θ1|Max of the absolute value of the first rake angle θ1 in the first region 61. In other words, in this case, it may be sufficient that |θ2|Min>|θ1|Max is satisfied. Note that here, the first rake angle θ1 of the first region 61 can be calculated in any cross section perpendicular to the first portion 5c1, and, similarly, the second rake angle θ2 of the second region 62 can be calculated in any cross section perpendicular to the second portion 5c2.

Further, the first region 61 may be a flat surface and may be inclined toward a rear side in a rotational direction Y as it extends from the side of the inner periphery toward the side of the outer periphery. The second region 62 may also be a flat surface and inclined toward the rear side in the rotation direction Y as it extends from the side of the inner periphery toward the side of the outer periphery.

The second rake angle θ2 may be constant. In this case, fluctuations in the cutting resistance applied to the second region 62 are low. In addition, since the orientation of the cutting force applied to the second portion 5c2 during the cut processing is stable, the cutting edge 5 may easily bite into the workpiece. As a result, the fracture resistance of the cutting edge 5 may increase and the machining accuracy may be improved.

Note that the second rake angle θ2 being constant does not mean that the second rake angle θ2 is the same across the entire region of the second region 62 in a strict sense, and it may be sufficient that the second rake angle θ2 is substantially the same across the region. For example, the second rake angle θ2 may have a variation of approximately 5%.

In addition, the first rake angle θ1 may also be zero. Specifically, in the example illustrated in FIG. 5, since the first rake angle θ1 is zero, the first region 61 may be parallel with the rotational axis X. In this case, for example, in the machining after the entire length of the cutting edge 5 has bit into the workpiece, since the cutting portion 11 becomes less likely to slip on a machining surface, the straightness of the machined hole may be improved. Here, when the first rake angle θ1 is zero across the entire region of the first region 61, a biting performance into the workpiece and the straightness of the machined hole may be even more favorably improved.

In the examples illustrated in FIG. 4 and FIG. 5, a ridge line r61 on the side of the rear end 3b in the first region 61 and a ridge line r62 on the side of the rear end 3b in the second region 62 may be both inclined toward the side of the rear end 3b as they extend from the rotational axis X toward the side of the outer periphery. When the ridge line r61 and the ridge line r62 are positioned in the above-described manner, the generated chips can be guided into the grooves 7 in a stable manner. As a result, chip dischargeability may be improved.

As illustrated in FIG. 4, at least a portion of the second region 62 may be positioned on the side of the rear end 3b with respect to the first region 61. Since the second portion 5c2 is positioned on the side of the outer periphery of the body 3 with respect to the first portion 5c1, more chips may be likely to be generated in the second portion 5c2 than in the first portion 5c1 during the machining. Here, when at least a portion of the second region 62 is positioned on the side of the rear end 3b with respect to the first region 61, the chips generated in the second portion 5c2 can be guided into the grooves 7 in a stable manner.

The rake face 6 can further have a third region 63 extending from the chisel edge 5a. A third rake angle θ3 of the third region 63 may be a negative value. Further, an absolute value of the third rake angle θ3 may decrease from a portion, in the third region 63, positioned near the rotational axis X, toward the side of the outer periphery of the body 3. In this case, since the third rake angle θ3 approaches zero as far away from the rotational axis X, the strength of the chisel edge 5a may be high, and the chisel edge 5a easily bites into the workpiece.

As in the example illustrated in FIG. 2, when viewed from the tip, the first portion 5c1 and the second portion 5c2 may each be linear, and a length L2 of the second portion 5c2 may be greater than a length L1 of the first portion 5c1 (L2>L1). In this way, when the second portion 5c2 is linear, the biting performance of the second portion 5c2 into the workpiece may be high.

In addition, when the length L2 of the second portion 5c2, which has the absolute value of the second rake angle θ2 that is relatively greater than that of the first portion 5c1, is greater than the length L1 of the first portion 5c1, the component acting in the direction along the rotational axis X may be large, of the cutting force generated during the machining. Thus, a force that presses the cutting portion 11 against the shank 9 may be large. As a result, both the biting performance into the workpiece and the straightness of the machined hole may be high.

As in the example illustrated in FIG. 2, when viewed from the tip, when the second portion 5c2 is linear, a first angle α formed by the first portion 5c1 and the second portion 5c2 and a second angle β formed by the second portion 5c2 and the first cutting edge 5b may both be obtuse angles, and the second angle β may be greater than the first angle α (β>α). When the second angle β is greater than the first angle α, since the cutting speed is relatively fast, the strength of a portion to which a larger cutting load is easily applied may be high. As a result, the cutting edge 5 may be less likely to be damaged.

For example, the first cutting edge 5b may be linear when viewed from the tip, or may have a concave curved shape when viewed from the tip as illustrated in FIG. 2. When the first cutting edge 5b has the concave curved shape, since the chips generated by the first cutting edge 5b are easily curled, the chips may be easily discharged by the grooves 7. The concave curved shape of the first cutting edge 5b may be a circular arc shape, for example.

The rake face 6 may further have a fourth region 64 extending from the first cutting edge 5b. A fourth rake angle θ4 of the fourth region 64 may be a positive value and may gradually change. For example, the fourth rake angle θ4 may increase as far away from the rotational axis X. In this case, since the fourth rake angle θ4 is relatively large in an outer peripheral side region, of the fourth region 64, in which the cutting speed is relatively fast, the cutting resistance may be low.

The fourth region 64 may be linear in a cross section orthogonal to the rotational axis X, or may have a concave curved shape. When the fourth region 64 has the concave curved shape in a cross-section orthogonal to the rotational axis X, the chips may be less likely to fly out of the outer peripheral surface of the body 3. Thus, the machining surface of the workpiece may be less likely to be damaged.

Further, in a side view as illustrated in FIG. 4, the width of the first region 61 in the direction orthogonal to the rotational axis X may become narrower as it extends away from the first portion 5c1. In this case, a wider width of the fourth region 64 toward the rear end 3b may be more easily ensured. Thus, the chips generated by the cutting edge 5 may be easily discharged to the side of the rear end 3b of the body 3 in a stable manner.

Similarly, in the side view as illustrated in FIG. 4, the width of the second region 62 in the direction orthogonal to the rotational axis X may become narrower as it extends away from the second portion 5c2. In this case also, the wider width of the fourth region 64 toward the rear end 3b may be more easily ensured. Thus, the chips generated by the cutting edge 5 may be easily discharged to the side of the rear end 3b of the body 3 in a stable manner.

In a front view of the first region 61, a boundary B between the first region 61 and the second region 62 may become further away from the rotational axis X as it extends toward the rear end 3b. In this case, the chips flowing through the first regions 61 and the second regions 62 may be easily guided toward the fourth region 64. Thus, the chips generated by the cutting edge 5 may be easily discharged to the side of the rear end 3b of the body 3 in a stable manner.

The drill 1 according to the present disclosure may be exemplified above, but the present disclosure is not limited to the above-described example, and can have any embodiments as long as it does not depart from the spirit of the present disclosure.

For example, the shape of the cutting portion 11 is not limited to the above-described aspect, and any other commonly used shape may be employed. For example, the cutting portion 11 may have a tapered shape in which a core thickness of an inscribed circle of the cutting portion 11 increases from the side of the tip end 3a toward the side of the rear end 3b. Also, the cutting portion 11 may be inclined such that the drill diameter (the outer diameter) increases or decreases from the side of the tip end 3a toward the side of the rear end 3b. Further, a so-called undercut or clearance may be provided in the cutting portion 11.

Method for Manufacturing Machined Product

Next, a method for manufacturing a machined product according to non-limiting embodiments will be described in detail using a case where the above-described drill 1 may be as an example. Below, a description will be made with reference to FIG. 7 to FIG. 9.

The method for manufacturing the machined product according to the non-limiting embodiments may have the following steps (1) to (3).

Figure 7:
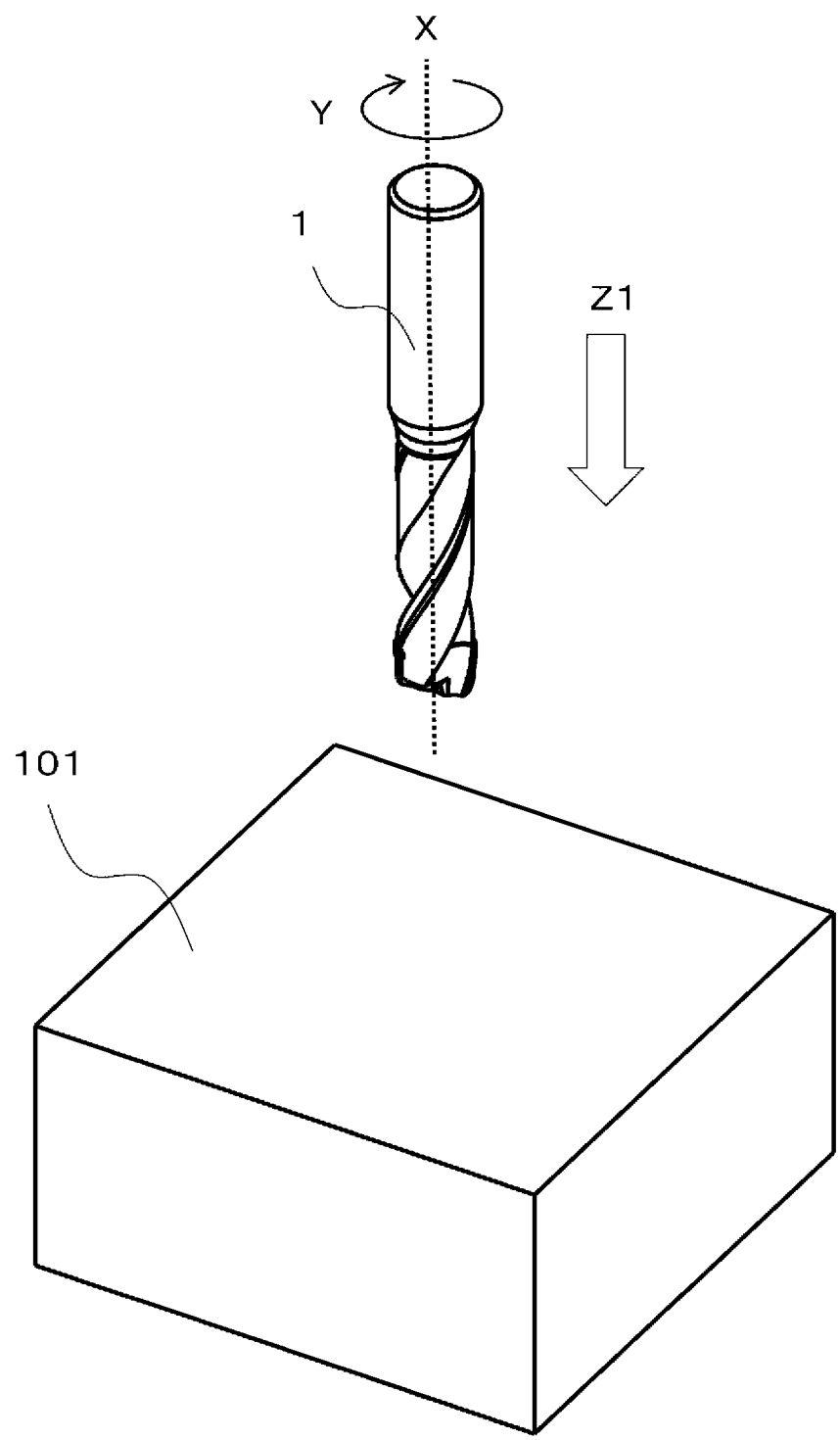
FIG. 7 is a view illustrating a step of a method for manufacturing a machined product according to a non-limiting embodiment of the present disclosure.

(1) A step of arranging the drill 1 above a prepared workpiece 101, rotating the drill 1 in the direction of the arrow Y around the rotational axis X, and bringing the drill 1 close to the workpiece 101 in a direction Z1 (see FIG. 7).

Figure 8:
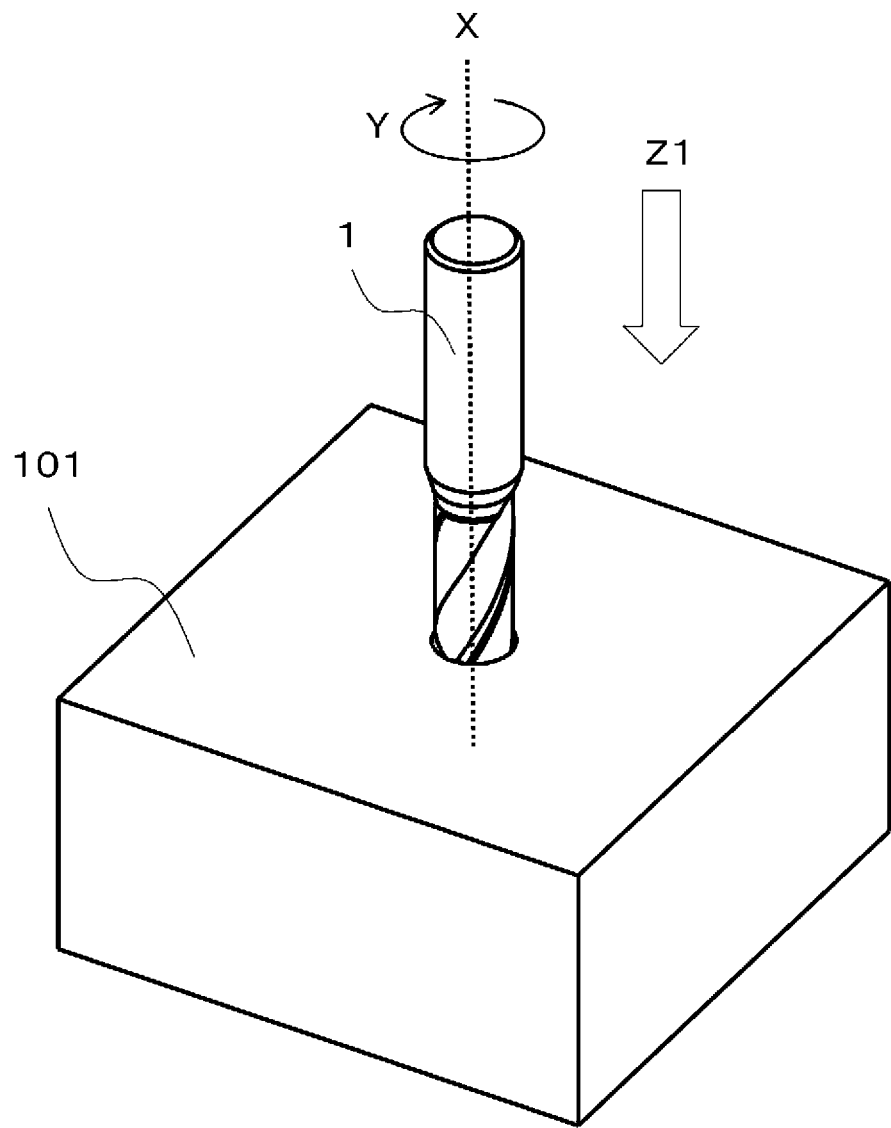
FIG. 8 is a view illustrating a step of a method for manufacturing a machined product according to a non-limiting embodiment of the present disclosure.

(2) A step of bringing the drill 1 even closer to the work material 101, thereby causing the cutting edge of the drill 1 that is rotating to come into contact with a desired position on a surface of the workpiece 101 to form a machined hole 103 (a through-hole) in the workpiece 101 (see FIG. 8).

Figure 9:
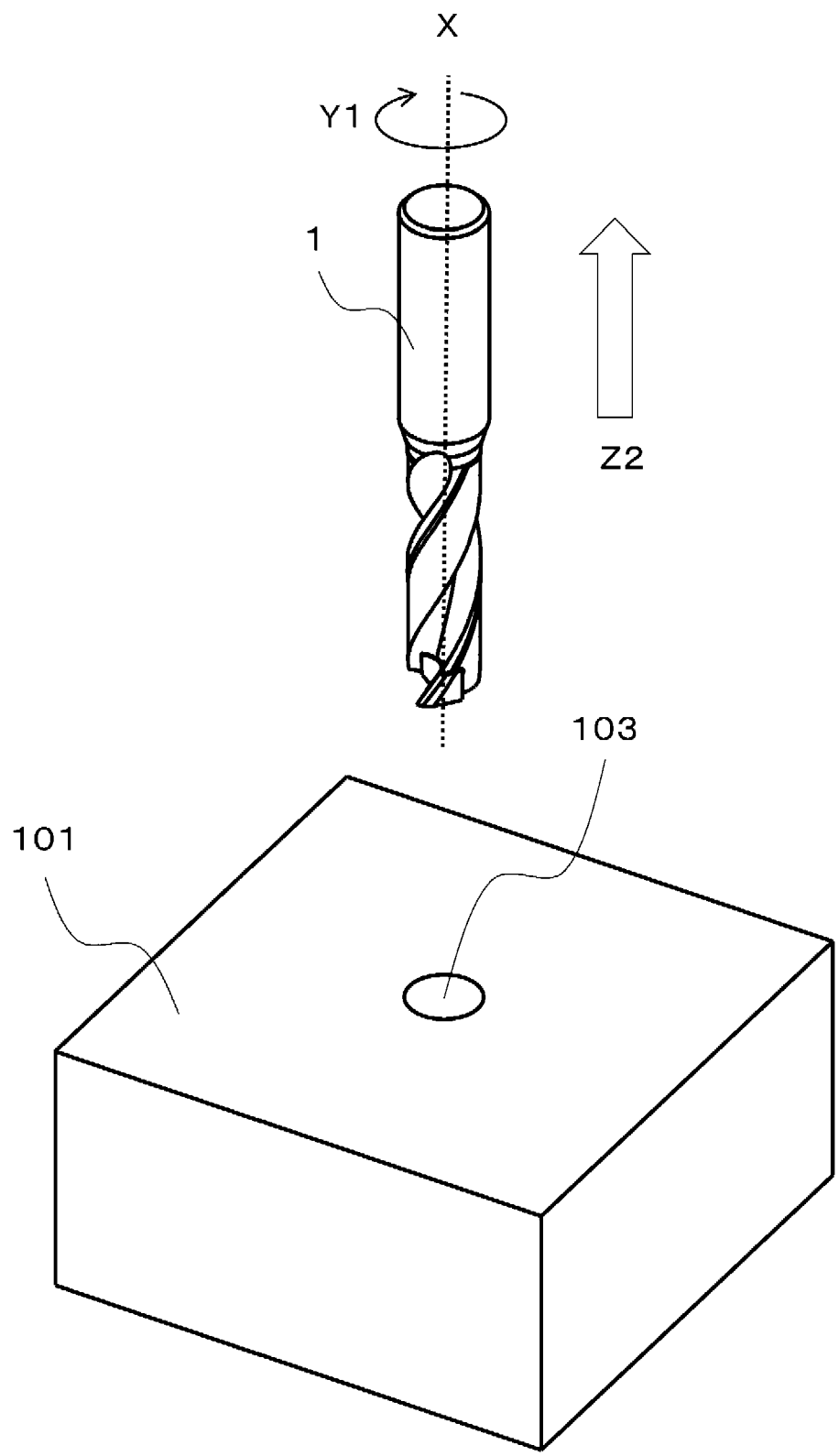
FIG. 9 is a view illustrating a step of a method for manufacturing a machined product according to a non-limiting embodiment of the present disclosure.

(3) A step of separating the drill 1 from the workpiece 101 in a direction Z2 (see FIG. 9).

Step (1), for example, may be performed by fixing the workpiece 101 on a table of the machine tool to which the drill 1 is attached, and bringing the drill 1 close to the workpiece 101 while maintaining the rotating state of the drill 1. Note that, in the step (1), the workpiece 101 and the drill 1 may be brought relatively close to each other, or the workpiece 101 may be brought close to the drill 1.

Next, in step (2), a partial region, on a side of the rear end, of the cutting portion of the drill 1 may be configured to be not inserted into the machined hole 103. In this way, by causing the partial region of the cutting portion on the side of the rear end to function as a region for discharging the chips, the chips can be smoothly discharged via the region.

In step (3) also, similarly to the above-described step (1), the workpiece 101 and the drill 1 may be relatively separated from each other. For example, the workpiece 101 may be separated from the drill 1.

With the above-described steps (1) to (3), according to the manufacturing method of the non-limiting embodiments, the machined product, including the machined hole 103 that can maintain a high straightness over a long period of time, can be obtained.

Note that when the machining of the workpiece 101 as described above is carried out a plurality of times, and for example, when a plurality of the machined holes 103 are to be formed in one workpiece 101, it is sufficient that a step of bringing the cutting edge of the drill 1 into contact with a different position of the workpiece 101 is repeated while maintaining the rotating state of the drill 1.

The non-limiting embodiments according to the present disclosure are described above, but the present disclosure is not limited to the above-described embodiments, and can have any embodiments as long as it does not depart from the spirit of the present disclosure.

REFERENCE SIGNS LIST

1 Drill
3 Body
5 Cutting edge
5a Chisel edge
5b First cutting edge
5c Second cutting edge
5c1 First portion
5c2 Second portion
6 Rake face
61 First region
62 Second region
63 Third region
64 Fourth region
7 Groove
9 Shank
11 Cutting portion
101 Workpiece
103 Machined hole

What is claimed is:

1. A drill comprising:
a body having a rod shape and extending along a rotational axis from a first end toward a second end;
a cutting edge positioned at the first end;
a rake face extending from the cutting edge toward the second end; and
a groove extending spirally from the rake face toward the second end,
wherein
the cutting edge comprises:
a curved chisel edge intersecting with the rotational axis,
a first cutting edge closer to an outer periphery of the body than the chisel edge, and
a second cutting edge connected to, and located between, the chisel edge and the first cutting edge;
the second cutting edge, in a front view of the first end, comprises:

a first portion having a linear shape and extending from the chisel edge toward the outer periphery, and a second portion in its entirety having a linear shape, directly connected to the first portion, extending from the first portion toward the first cutting edge, and inclined with respect to the first portion;

the rake face comprises:

a first region, spaced apart from the rotational axis, extending from the first portion and having a first rake angle, a second region extending from the second portion and having a second rake angle, and the first region and the second region being distinct surfaces;

at least a portion of the second region is closer to the second end than the first region;

a width of the first region in a direction orthogonal to the rotational axis becomes narrower moving continuously along the first region in a direction away from the first portion in a side view;

a width of the second region in the direction orthogonal to the rotational axis becomes narrower moving continuously along the second region in a direction away from the second portion in the side view;

the first rake angle is either zero or a negative value;

the second rake angle is a negative value; and an absolute value of the second rake angle is greater than an absolute value of the first rake angle.

2. The drill according to claim 1, wherein
a boundary between the first region and the second region becomes further away from the rotational axis as the boundary extends toward the second end, in a front view of the first region.

3. The drill according to claim 1, wherein
the second rake angle is constant.

4. The drill according to claim 1, wherein
the first rake angle is zero.

5. The drill according to claim 1, wherein
the rake face further comprises a third region extending from the chisel edge and having a third rake angle,
the third rake angle is a negative value, and
an absolute value of the third rake angle decreases from a portion positioned near the rotational axis toward the side of the outer periphery.

6. The drill according to claim 1, wherein
a second length of the second portion is greater than a first length of the first portion in the front view.

7. The drill according to claim 1, wherein
each of the first portion and the second portion is linear in the front view,
a first angle is formed by the first portion and the second portion,
a second angle is formed by the second portion and the first cutting edge,
each of the first angle and the second angle is an obtuse angle in the front view, and
the second angle is greater than the first angle.

8. A method for manufacturing a machined product, the method comprising:
rotating the drill described in claim 1;
bringing the drill that is rotating to come into contact with a workpiece; and
separating the drill from the workpiece.

9. A drill comprising:
a body having a rod shape and extending along a rotational axis from a first end toward a second end;
a cutting edge positioned at the first end;
a rake face extending from the cutting edge toward the second end; and
a groove extending spirally from the rake face toward the second end,
wherein
the cutting edge comprises:
a curved chisel edge intersecting with the rotational axis,
a first cutting edge closer to an outer periphery of the body than the chisel edge, and
a second cutting edge connected to, and located between, the chisel edge and the first cutting edge;
the second cutting edge, in a front view of the first end, comprises:
a first portion having a linear shape and extending from the chisel edge toward the outer periphery, and
a second portion in its entirety having a linear shape, directly connected to the first portion, extending from the first portion toward the first cutting edge, and inclined with respect to the first portion;
the rake face comprises:
a first region, spaced apart from the rotational axis, extending from the first portion, the first region having a first rake angle and being a substantially triangular-shaped surface in a side view of the drill,
a second region extending from the second portion, the second region having a second rake angle and being a substantially triangular-shaped surface in the side view of the drill, and
a boundary between the first region and the second region;
at least a portion of the second region is closer to the second end than the first region;
the first rake angle is either zero or a negative value;
the second rake angle is a negative value; and
an absolute value of the second rake angle is greater than an absolute value of the first rake angle.

10. The drill according to claim 9, wherein
the second rake angle is constant.

11. The drill according to claim 9, wherein
the first rake angle is zero.

12. The drill according to claim 9, wherein
the rake face further comprises a third region extending from the chisel edge and having a third rake angle,
the third rake angle is a negative value, and
an absolute value of the third rake angle decreases from a portion positioned near the rotational axis toward the side of the outer periphery.

13. The drill according to claim 9, wherein
a second length of the second portion is greater than a first length of the first portion in the front view.

14. The drill according to claim 9, wherein
each of the first portion and the second portion is linear in the front view,
a first angle is formed by the first portion and the second portion,
a second angle is formed by the second portion and the first cutting edge,
each of the first angle and the second angle is an obtuse angle in the front view, and
the second angle is greater than the first angle.

15. The drill according to claim 9, wherein
a width of the first region in a direction orthogonal to the rotational axis becomes narrower moving along the first region away from the first portion in the side view.

16. The drill according to claim 9, wherein
a width of the second region in the direction orthogonal to the rotational axis becomes narrower moving along the second region away from the second portion in the side view.

17. The drill according to claim 9, wherein
the boundary between the first region and the second region becomes further away from the rotational axis as the boundary extends toward the second end, in a front view of the first region.

18. A method for manufacturing a machined product, the method comprising:
rotating the drill described in claim 9;
bringing the drill that is rotating to come into contact with a workpiece; and
separating the drill from the workpiece.

* * * * *